(12) United States Patent
Fouda et al.

(10) Patent No.: US 11,500,119 B2
(45) Date of Patent: Nov. 15, 2022

(54) MULTI-ZONE PROCESSING OF PIPE INSPECTION TOOLS

(71) Applicant: Halliburton Energy Services, Inc., Houston, TX (US)

(72) Inventors: Ahmed Elsayed Fouda, Spring, TX (US); Junwen Dai, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 86 days.

(21) Appl. No.: 16/749,780

(22) Filed: Jan. 22, 2020

(65) Prior Publication Data
US 2020/0333500 A1 Oct. 22, 2020

Related U.S. Application Data

(60) Provisional application No. 62/836,033, filed on Apr. 18, 2019.

(51) Int. Cl.
*G01V 3/12* (2006.01)
*G01V 3/38* (2006.01)
*G01B 7/06* (2006.01)

(52) U.S. Cl.
CPC ............... *G01V 3/12* (2013.01); *G01B 7/10* (2013.01); *G01V 3/38* (2013.01)

(58) Field of Classification Search
CPC .......... G01B 7/10; G01B 21/045; G01B 7/13; G01V 3/12; G01V 3/38; G01V 3/10;
(Continued)

(56) References Cited

U.S. PATENT DOCUMENTS 6,359,434 B1 * 3/2002 Winslow ............ G01N 27/9046
324/220
7,960,969 B2 6/2011 Mouget et al.
(Continued)

FOREIGN PATENT DOCUMENTS

WO WO-2017099735 A1 * 6/2017 ............ E21B 47/082
WO WO-2017196357 A1 * 11/2017 ............ E21B 47/092
(Continued)

OTHER PUBLICATIONS

International Search Report and Written Opinion for Application No. PCT/US2020/017822, dated Jun. 19, 2020.
(Continued)

*Primary Examiner* — Jay Patidar
(74) *Attorney, Agent, or Firm* — John Wustenberg; C. Tumey Law Group PLLC

(57) ABSTRACT

A method and system for estimating a pipe property for a plurality of nested pipes. The method may comprise disposing an electromagnetic logging tool in a wellbore. The electromagnetic logging tool may comprise a transmitter disposed on the electromagnetic logging tool and a receiver disposed on the electromagnetic logging tool. The method may further comprise transmitting an electromagnetic field from the transmitter into a pipe string to energize the pipe string with the electromagnetic field thereby producing an eddy current that emanates from the pipe string, measuring the eddy current in the pipe string with the receiver on at least one channel to obtain a plurality of measurements, forming a log from the plurality of measurements, zoning
(Continued)

the log into a plurality of zones based at least in part on a well plan, and extracting a representative signal for each zone of the plurality of zones.

20 Claims, 11 Drawing Sheets

(58) Field of Classification Search
CPC .. E21B 47/006; E21B 47/085; E21B 2200/20; G01N 27/9006; G01N 27/9026; G01N 27/9046; G01N 27/041; G01N 27/72
See application file for complete search history.

(56) References Cited

U.S. PATENT DOCUMENTS

| | | | |
|---|---|---|---|
| 9,715,034 | B2 | 7/2017 | Omeragic et al. |
| 9,983,173 | B2 | 5/2018 | Aslanyan et al. |
| 2014/0216734 | A1* | 8/2014 | Hupp ................ E21B 47/13 166/255.1 |
| 2015/0338541 | A1 | 11/2015 | Nichols et al. |
| 2017/0176629 | A1* | 6/2017 | Omeragic ............... G01V 3/28 |
| 2018/0106763 | A1 | 4/2018 | Fouda et al. |
| 2018/0106764 | A1* | 4/2018 | Fouda .................. G01V 13/00 |
| 2018/0172872 | A1 | 6/2018 | Fouda et al. |
| 2018/0313207 | A1 | 11/2018 | Khalaj Amineh et al. |
| 2019/0078430 | A1 | 3/2019 | Fouda et al. |

FOREIGN PATENT DOCUMENTS

| | | | |
|---|---|---|---|
| WO | 2018-031036 | 2/2018 | |
| WO | 2018031047 A1 | 2/2018 | |
| WO | WO-2018031038 A1 * | 2/2018 | .............. G01B 7/12 |
| WO | WO-2018031047 A1 * | 2/2018 | ......... G01N 27/9086 |
| WO | 2018-190831 | 10/2018 | |
| WO | WO-2018190831 A1 * | 10/2018 | ............ E21B 21/01 |
| WO | 2018222209 A1 | 12/2018 | |

OTHER PUBLICATIONS

S. M. Haugland, "Fundamental analysis of the remote-field eddy-current effect", IEEE Transactions on Magnetics, vol. 32, No. 4, pp. 3195-3211, 1996.

J. Garcia et al., "Successful application of a new electromagnetic corrosion tool for well integrity evaluation in old wells completed with reduced diameter tubular," IPTC 16997.

Schlumberger, EM Pipe Scanner, Electromagnetic casing inspection tool, 2009.

GoWell, Magnetic Thickness Detector (MTD), Nov. 2018.

Halliburton, Well Assurance, Electromagnetic Pipe Xaminer® V (EPX™ V) Tool, May 2019.

TGT, EMPulse,https7/tgtdiagnostics.com/system/pulse/.

* cited by examiner

MULTI-ZONE PROCESSING OF PIPE INSPECTION TOOLS

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure and should not be used to limit or define the disclosure.

DETAILED DESCRIPTION

Figure 1:
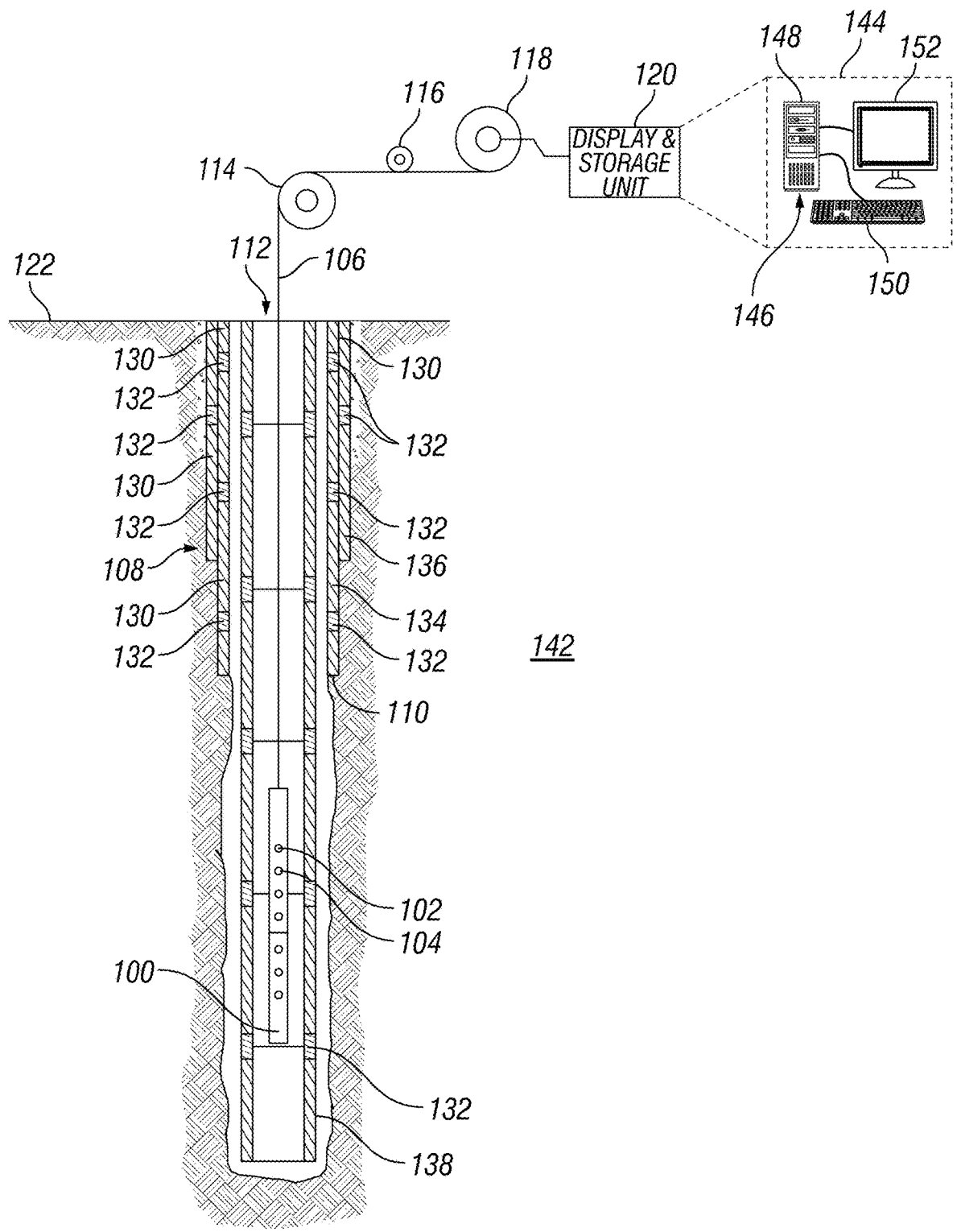
FIG. 1 illustrates an example of an EM logging tool disposed in a wellbore.

This disclosure may generally relate to pipe inspection in subterranean wells and, more particularly, to methods for identifying artifacts with an electromagnetic logging tool in an eccentric pipe configuration comprising a plurality of pipes. Electromagnetic (EM) sensing may provide continuous in-situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more).

EM logging tools may measure eddy currents to determine metal loss and use magnetic cores with one or more coils to detect defects in multiple concentric pipes. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. In examples, EM logging tools may operate on a conveyance. Additionally, EM logging tools may include an independent power supply and may store the acquired data on memory.

Monitoring the condition of the production and intermediate casing strings is crucial in oil and gas field operations. EM eddy current (EC) techniques have been successfully used in inspection of these components. EM EC techniques include two broad categories: frequency-domain EC techniques and time-domain EC techniques. In both techniques, one or more transmitters are excited with an excitation signal, and the signals from the pipes are received and recorded for interpretation. The magnitude of a received signal is typically inversely proportional to the amount of metal that is present in the inspection location. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be a non-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point. Additionally, a multiple zone EM log may be applied for log correction, estimation of pipe magnetic permeability and electrical conductivity, total thickness estimation, and sensitivity analysis for channel selection for inversion.

FIG. 1 illustrates an operating environment for an EM logging tool 100 as disclosed herein in accordance with some embodiments. EM logging tool 100 may comprise a transmitter 102 and/or a receiver 104. In examples, transmitters 102 and receivers 104 may be coil antennas. Furthermore, transmitter 102 and receiver 104 may be separated by a space between about 0.1 inches (0.254 cm) to about 200 inches (508 cm). In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104 or vice versa. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110.

Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

During operations, transmitter 102 may broadcast electromagnetic fields into subterranean formation 142. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. In examples, a remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \qquad (1)$$

and the magnitude of the impedance shows the dependence:

$$\exp\left[-2\left(\sqrt{\frac{\omega\mu\sigma}{2}}\right)t\right] \qquad (2)$$

where $\omega$ is the angular frequency of the excitation source, $\mu$ is the magnetic permeability of the pipe, $\sigma$ is the electrical conductivity of the pipe, and $t$ is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \cong 2\frac{t}{\delta} \qquad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
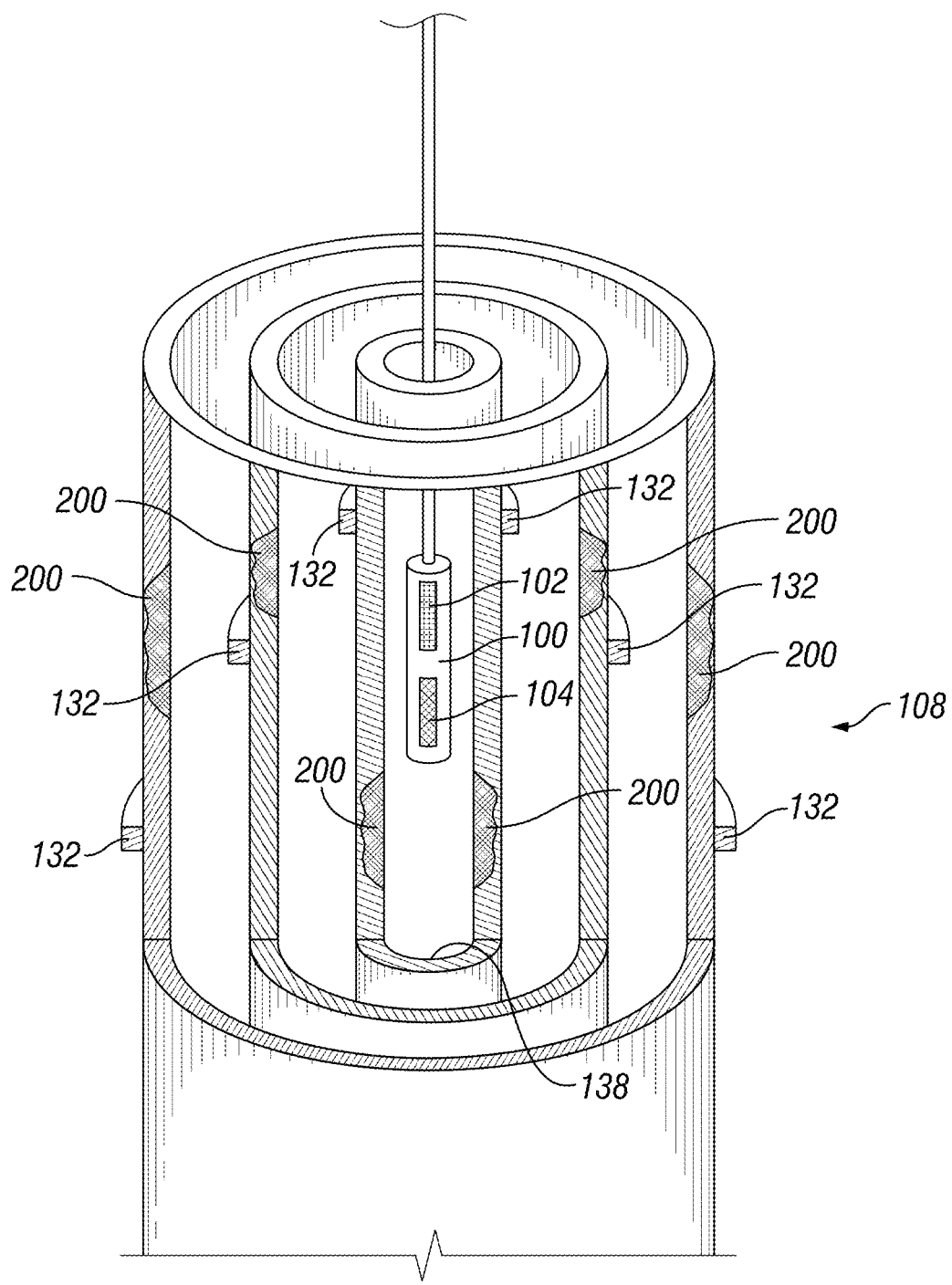
FIG. 2 illustrates an example of arbitrary defects within multiple pipes.
Figure 3A:
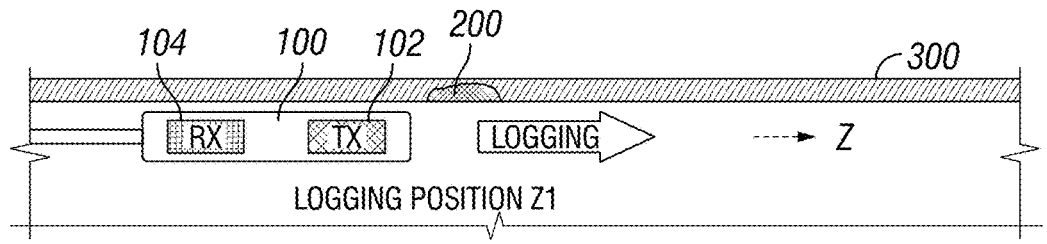
FIG. 3A illustrates an example of an EM logging tool traversing a wellbore.
Figure 3B:
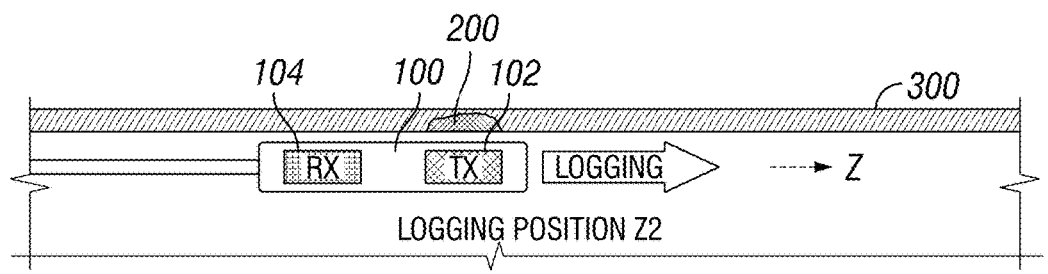
FIG. 3B illustrates another example of an EM logging tool traversing a wellbore.
Figure 3C:
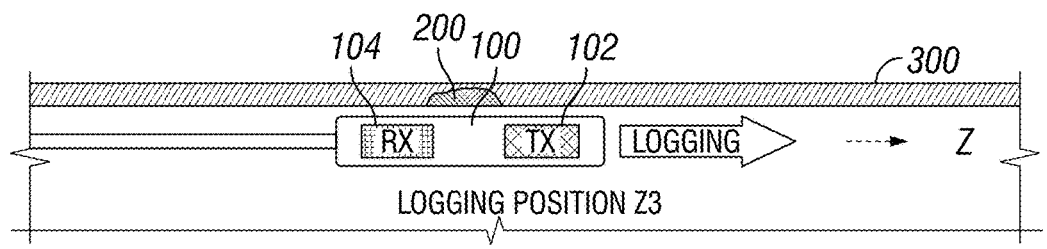
FIG. 3C illustrates another example of an EM logging tool traversing a wellbore.
Figure 3D:
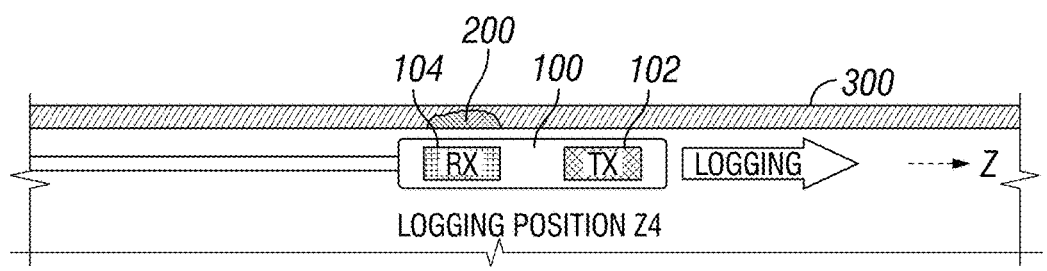
FIG. 3D illustrates another example of an EM logging tool traversing a wellbore.
Figure 3E:
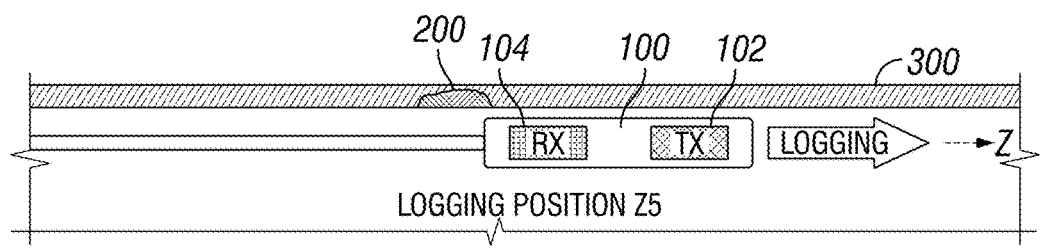
FIG. 3E illustrates another example of an EM logging tool traversing a wellbore.

FIG. 2 shows EM logging tool 100 disposed in pipe string 138 which may be surrounded by a plurality of nested pipes (e.g., first casing 134 and second casing 136) and an illustration of anomalies 200 disposed within the plurality of nested pipes, in accordance with some embodiments. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing, and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. It should be noted that inversion methods may include model-based inversion which may include forward modeling. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet). Due to these complications, methods may need to be used to accurately inspect pipe features.

FIGS. 3A-3E illustrates an electromagnetic inspection and detection of anomalies 200 (e.g., defects) or collars 132 (e.g., Referring to FIG. 2), in accordance with some embodiments. As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly, by inspecting the signal loss, it may be possible to identify metal gain such as due to presence of a casing collar 132 (e.g., Referring to FIG. 1) where two pipes meet with a threaded connection. In order to distinguish signals from different pipes in a multiple concentric pipe configuration, multiple transmitter-receiver spacing, and frequencies may be used. For example, short spaced transmitters 102 and receivers 104 may be sensitive to pipe string 138, while long spaced transmitters 102 and receivers 104 may be sensitive to deeper pipes (e.g., first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or anomalies 200 (e.g., defects).

For example, due to eddy current physics and electromagnetic attenuation, pipes disposed in pipe string 138 (e.g., referring to FIG. 1 and FIG. 2) may generate an electrical signal that may be in the opposite polarity to the incident signal and results in a reduction in the received signal. Generally, as metal volume increases the signal loss may increase. As a result, by inspecting the signal gains, it may be possible to identify zones with metal loss (such as corrosion). In order to distinguish signals that originate from anomalies 200 (e.g., defects) at different pipes of a multiple nested pipe configuration, multiple transmitter-receiver spacing, and frequencies may be used. For example, short spaced transmitters 102 and receivers 104 may be sensitive to first pipe string 138 (e.g., referring to FIG. 2), while long spaced transmitters 102 and receivers 104 can be sensitive to deeper ($2^{nd}$, $3^{rd}$, etc.) pipes (e.g., first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) Spatial spread of long spaced transmitter-receiver signal for a collar 132 may be long (up to 6 feet); (4) To accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example when more than two pipes may be present in pipe string 138.

During logging operations as EM logging tool 100 traverses across pipe 300 (e.g., Referring to FIG. 3), An EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

Figure 4:
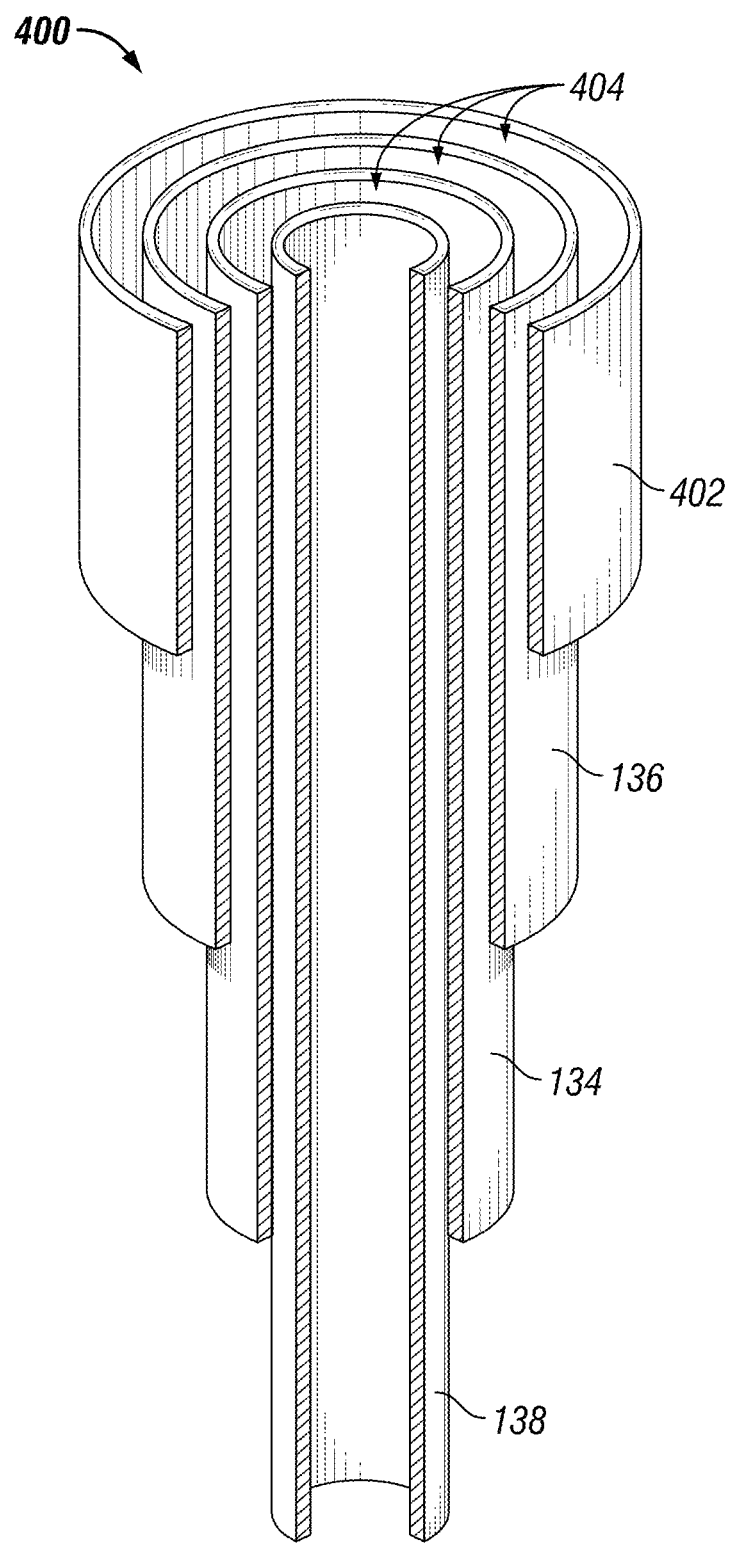
FIG. 4 illustrates an example of a well plan.
Figure 5:
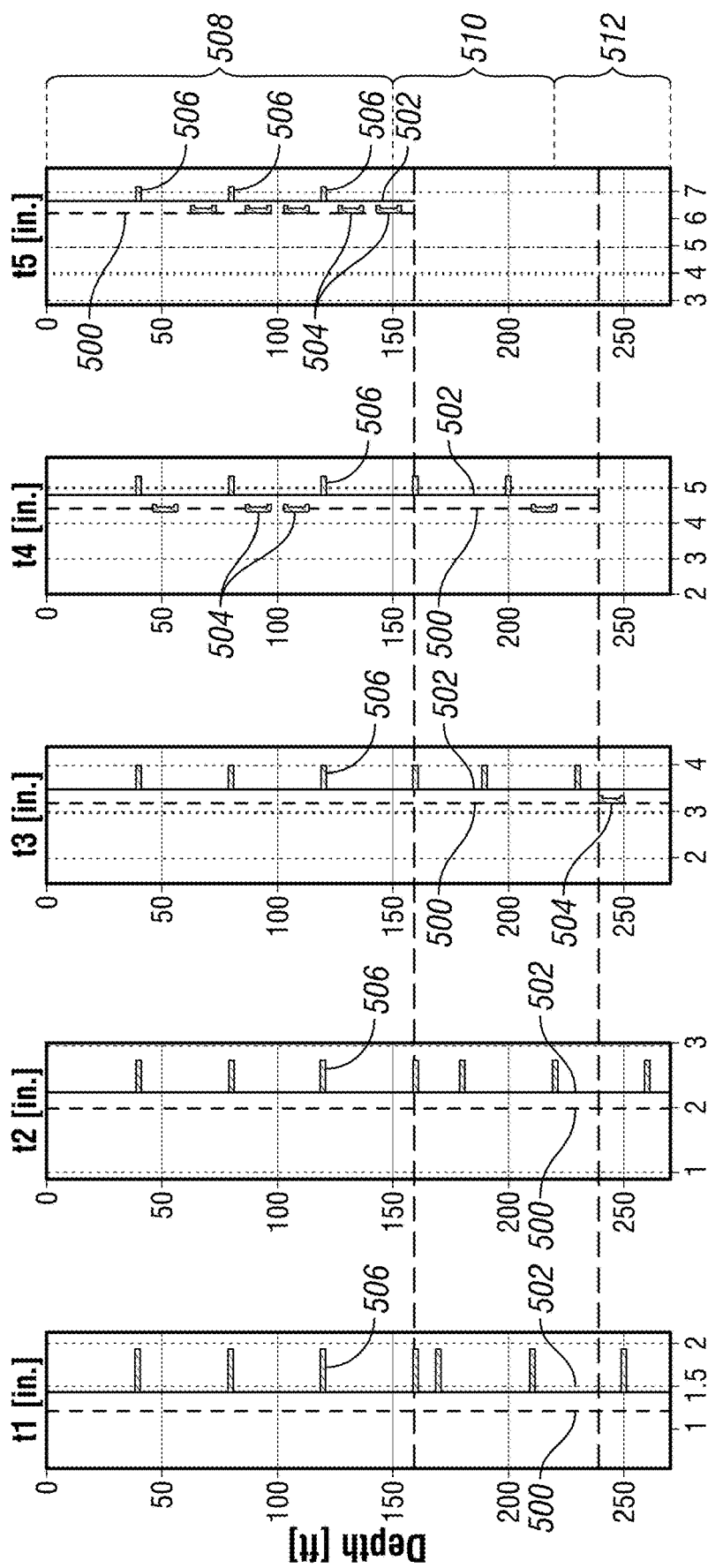
FIGS. 5A-5E are graphs illustrating examples of EM logs.

FIG. 4 illustrates an example of a well plan 400 in accordance with some embodiments. Depending on the design of well plan 400, well construction may have between two and four main components. These components include conductor, surface, intermediate and production casings. After completion of the well, a tubing may be inserted to pump hydrocarbon products. In this example, well plan 400 may comprise pipe string 138, first casing 134, second casing 136, a conductor casing 402, and wherein cement may be disposed in annulus 404 between each casing. However, it should be noted that well plan 400 may include any number of pipes, casings, tubulars, and/or the link. Well plan 400 is not limited or bound by the four pipes that are displayed in FIG. 4. When the EM logging tool 100 is used to monitor the pipe condition a log may be produced. The log may be affected by many factors, for instance, the pipe electrical properties and pipe geometry including number, size, and shape. Additionally, the number of casings may be one of the most influential factors that may impact the signal level. The signal level change may provide information to interpret the EM log for better pipe inspection. The nominal signals corresponding to each zone with known pipe configuration may be extracted to analyze the characteristics of individual pipe properties.

Described below are systems and methods to zone the EM pipe inspection measurements according to significant signal level change. The extracted log along with known pipe configuration may be utilized for the following algorithms to improve tool accuracy. In examples, algorithms may include a multi-zone correction algorithm (MZCA). This algorithm establishes a non-linear mapping function to correct the non-linearity between zones. It eliminates the model/tool discrepancy due to several factors including transmitter magnetic core, etc. Another method may be a permeability and conductivity estimation algorithm (MSEA). This algorithm estimates the pipe magnetic permeability and electrical conductivity. A channel selection algorithm (CSA) may be used. This algorithm may help make decision on choosing adequate number of receivers to use in a given zone based on sensitivity to zone transitions. Additionally, a total thickness algorithm (TTA). This algorithm computes the total thickness of all pipes to fast assess the integrity of the well tubulars.

FIGS. 5A-5E are graphs illustrating an EM log of simulated data, the simulated data is used to illustrate how to locate corrosion and other structures across a well plan 400 (e.g., referring to FIG. 4), where the well plan 400 has five concentric pipes, in accordance with some embodiments. The measurements were taken with an EM logging tool 100 which includes one transmitter 102 as a transmitting coil and six receivers 104 that are receiving coils (e.g., referring to FIG. 1). In this example, transmitter 102 may have a core with relative permeability of 70 and receivers 104 do not have a core. Measurements were performed at the different frequencies ranging from 1 Hz to 60 Hz. In the example, EM logging tool 100 is run inside five concentric pipes. Each pipe has a specific graph in FIGS. 5A-5E. Parameters of the pipes are summarized in Table 1.

TABLE 1

| Pipe | $1^{st}$ | $2^{nd}$ | $3^{rd}$ | $4^{th}$ | 5th |
|---|---|---|---|---|---|
| OD (inch) | 2.875 | 4.5 | 7.0 | 9.625 | 13.375 |
| Thickness (inch) | 0.217 | 0.25 | 0.317 | 0.395 | 0.43 |
| Permeability | 70 | 70 | 70 | 70 | 70 |
| Conductivity ($\times 10^6$ S/m) | 4.5 | 4.5 | 4.5 | 4.5 | 4.5 |

Each graph in FIGS. 5A-5E illustrate pipe inner wall 500, pipe outer wall 502, corrosion 504, and/or collar 506. Additionally, as illustrated, each graph may be broken into a first zone 508, a second zone 510, and a third zone 512

Figure 6:
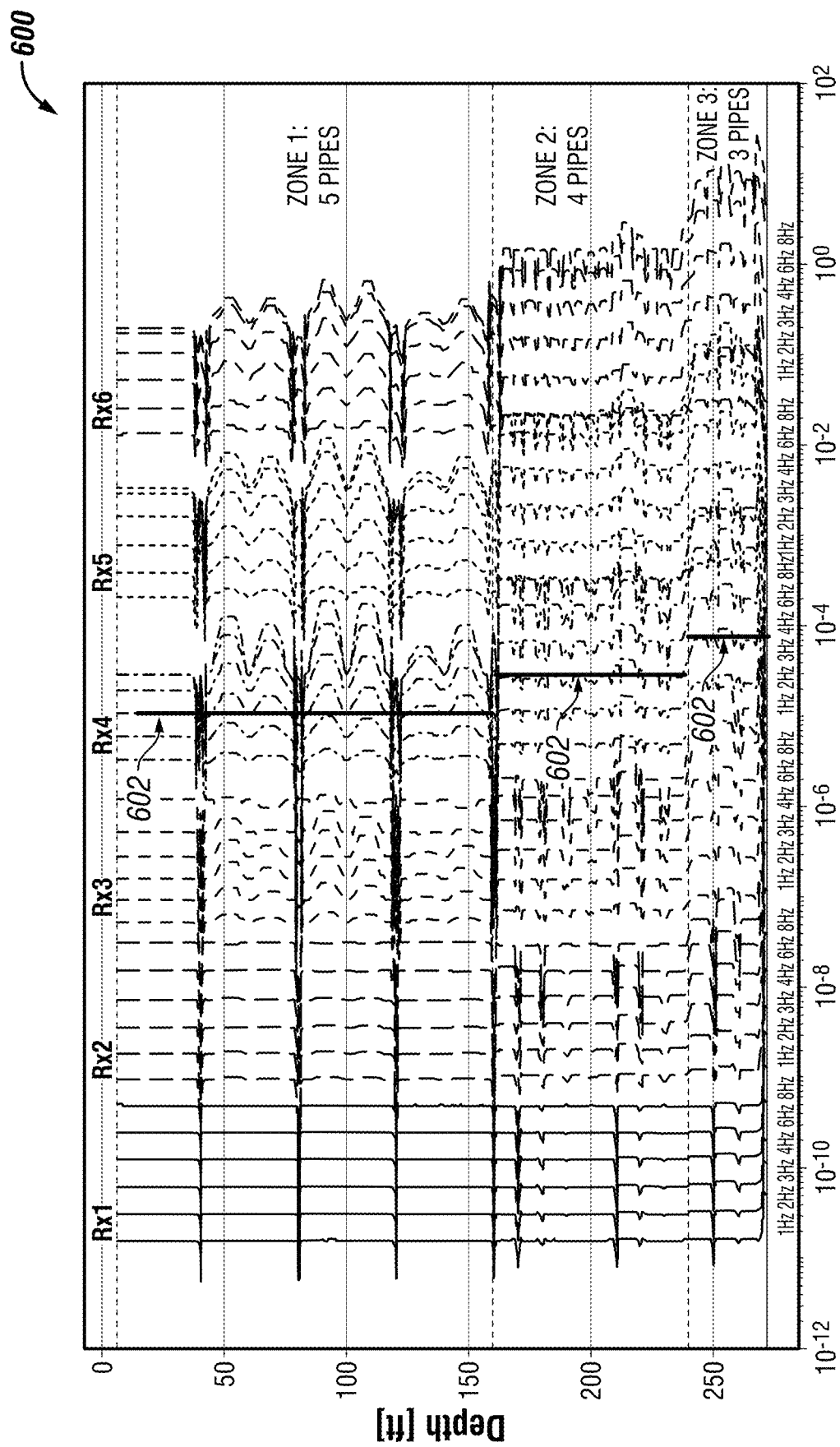
FIG. 6 is an example of a synthetic log.

FIG. 6 illustrates a synthetic log 600 produced from EM logging tool 100 (e.g., referring to FIG. 1), which contains channels from six different receivers, in accordance with some embodiments. Each receiver has six different frequencies. Considerable signal levels change may be observed among zones. This is defined as zone transition. Line 602 indicates a nominal signal level (the baseline) shift for the third channel of fourth receiver. The nominal signal level is measured when all pipes are within nominal parameters, which is defined as the most common signal level for a given channel within an individual zone. The zone transition occurs when a tubing starts, ends, or changes thickness. Signatures of zone transitions may be characteristic of the material properties of the pipes, thus, it may provide more information for MZCA, MSEA, TTA, and CSA.

As described below, a multi-zone correction algorithm (MZCA) computes strictly monotonic, piece-wise linear mapping function between measured and modeled zone nominals and uses this function to correct non-linearity in the measured response. Such non-linearity may exist due to model/tool mismatch which could arise from different factors including the absence of transmitter core in the R-1D model, inaccurate mu/sigma, etc. MZCA is expected to improve the accuracy of EM logging tool 100 (e.g., referring to FIG. 1) to large defects especially on outer pipes. It also improves the consistency of the inversion done with different sets of receivers/frequencies/amplitude/phase by calibrating all channels to well plan zone nominals which act as "anchor points."

Figure 7:
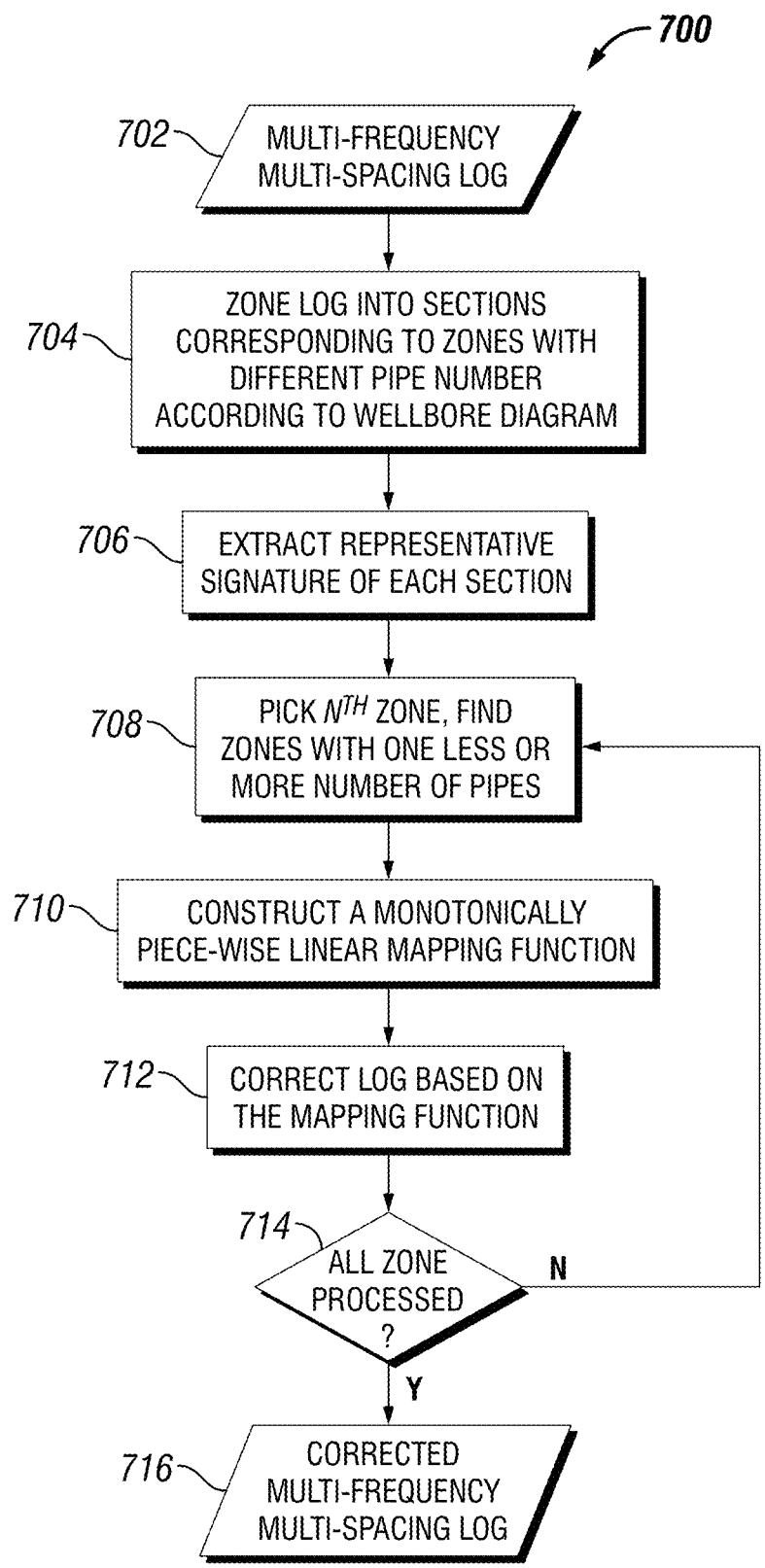
FIG. 7 is an example workflow for a multi-zone correction algorithm (MZCA)

FIG. 7 illustrates a workflow 700 for a multi-zone correction algorithm, in accordance with some embodiments. Workflow 700 may begin with block 702. Block 702 may include obtaining multi-frequency and multi-spacing log. In this block EM logging tool 100 may be disposed in wellbore 110 (e.g., referring to FIG. 1) for logging operations. During logging operations, one or more transmitters may emit an electromagnetic field and form eddy currents within a secondary conductive structure. One or more receivers may sense and/or measure the eddy currents in a frequency and/or time domain. Measurements may be taken and formed into a log.

In block 704, the log may be divided into zones at the position which pipe number changes. Since the pipe configuration is usually provided when the well was completed, from top to bottom, the log may be divided into any number of zones, which may be separated by any number of boundaries. It should be noted that zoning boundary adjustments may be necessary, since heavy casing strings may sink over time.

After dividing the log into zone, in block 706 a representative signal may be extracted. A representative signal may be a nominal signal. The nominal signal may be an ideal electromagnetic response acquired when the pipes are within nominal parameters. In examples a nominal configuration of well plan 400 (e.g., referring to FIG. 4) to obtain a nominal signal. However, as a practice, the nominal signal levels are defined as the most common signal level for a given channel within the zone (the mode of the channel or the level corresponding to the peak of the histogram in FIG. 6). The representative signals for all zones may be statistically selected.

In block 708, to construct the mapping function for $n^{th}$ zone, a number of adjacent zones may be selected as described above. The adjacent zones are defined as one more or one less pipe number. For example, in a well plan 400 with four pipes, zone 2 is adjacent to zones 1 (one more pipe) and zone 3 (one less pipe), which may be selected for the monotonically piece-wise linear mapping function. It should be noted that, adjacent zones are not necessarily to be physically connected.

Figure 8:
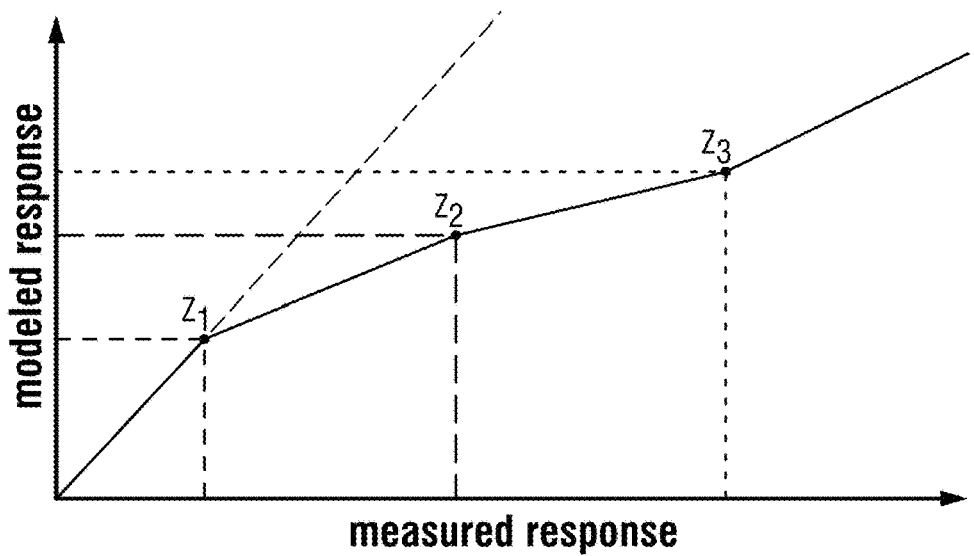
FIG. 8 illustrates an example of a monotonically piece-wise linear mapping function.
Figures 9A, 9B, 9C, 9D, 9E:
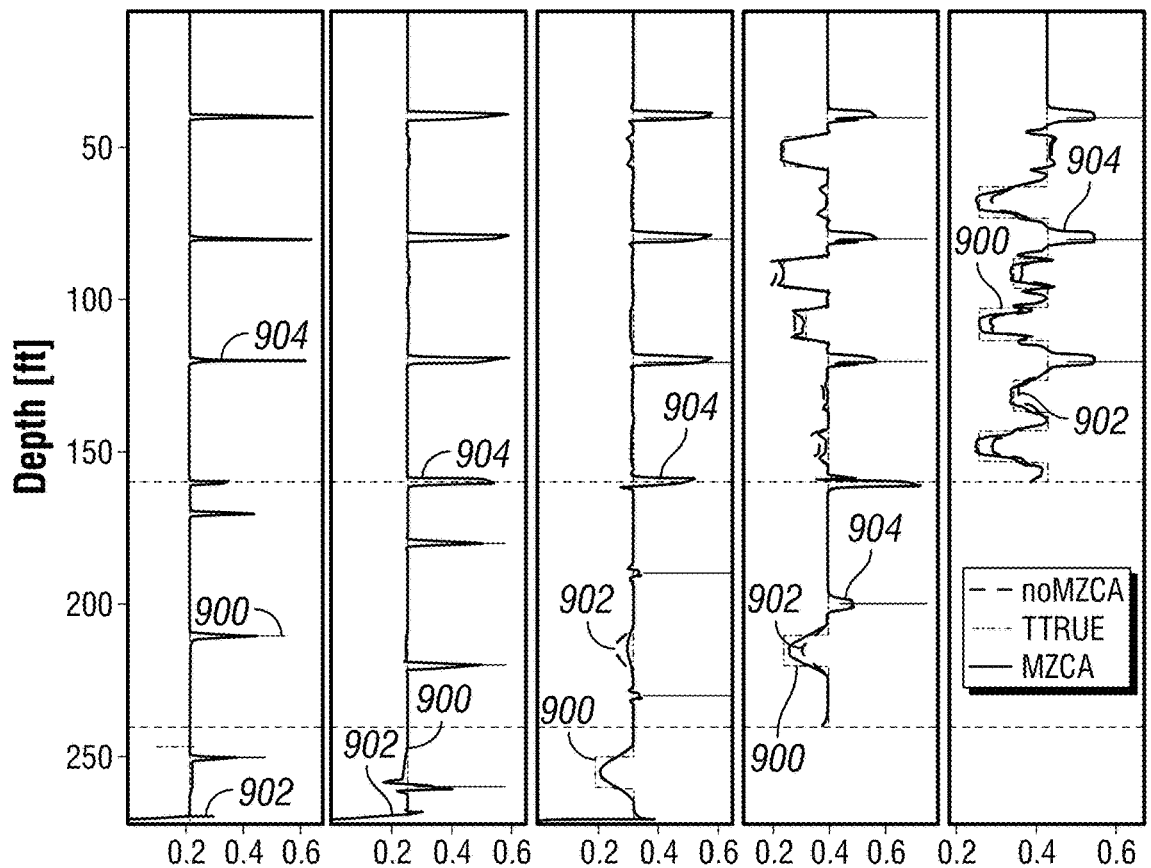
FIGS. 9A-9E are graphs of inversion results for the pipes in FIGS. 5A-5E.

After adjacent zones are determined, in block 710 a monotonically piece-wise linear mapping function may be constructed. For a given zone, a monotonically piece-wise linear mapping function between measured and modeled responses for each channel should be established first. Once the zones are determined, the measured and modeled responses may be provided for further processing. The measured response may be obtained from the representative signal from block 706. The modeled response refers to a tool response in the condition of nominal pipe parameters, which may be calculated by a forward electromagnetic solver. FIG. 8 illustrates a monotonically piece-wise linear mapping function between measured and modeled responses for zone 2. The mapping function may be given for each individual zone.

Referring back to FIG. 7, in block 712 the log may be corrected based on the mapping function. Once the mapping functions are established in block 710, the input measured response may be transferred into the model domain. The procedure of the multi-zone correction may eliminate the discrepancies between measurements from EM logging tool 100 (e.g., referring to FIG. 1) and the synthetic model used in inversion.

In block 714 all zones are reviewed to make sure they are processed. If they are not processed, then the process goes back to block 708. If all zones are processed, then workflow 700 moves to block 716 as a corrected multi-frequency and multi-spacing log.

The inversion result, i.e., individual pipe thickness, of the synthetic log using workflow 700 for information from Table 1 for measurements from FIGS. 5A-5E are given in FIGS. 9A-9E. FIGS. 9A-9E are inversion results for each tubing shown in FIGS. 5A-5E, in accordance with some embodiments. Curves 900 are true pipe thicknesses. Curves 902 are the inverted pipe thicknesses without application of MZCA. Curves 904 show the inverted pipe thicknesses with MZCA. As shown, with the application of MZCA, the ghost defects on 4th pipe (at 68', 131', and 148') and on 3rd pipe (at 210') have been mitigated. The real pipe defects on different pipes have been accurately retrieved to be as close to true values as possible.

Figure 10:
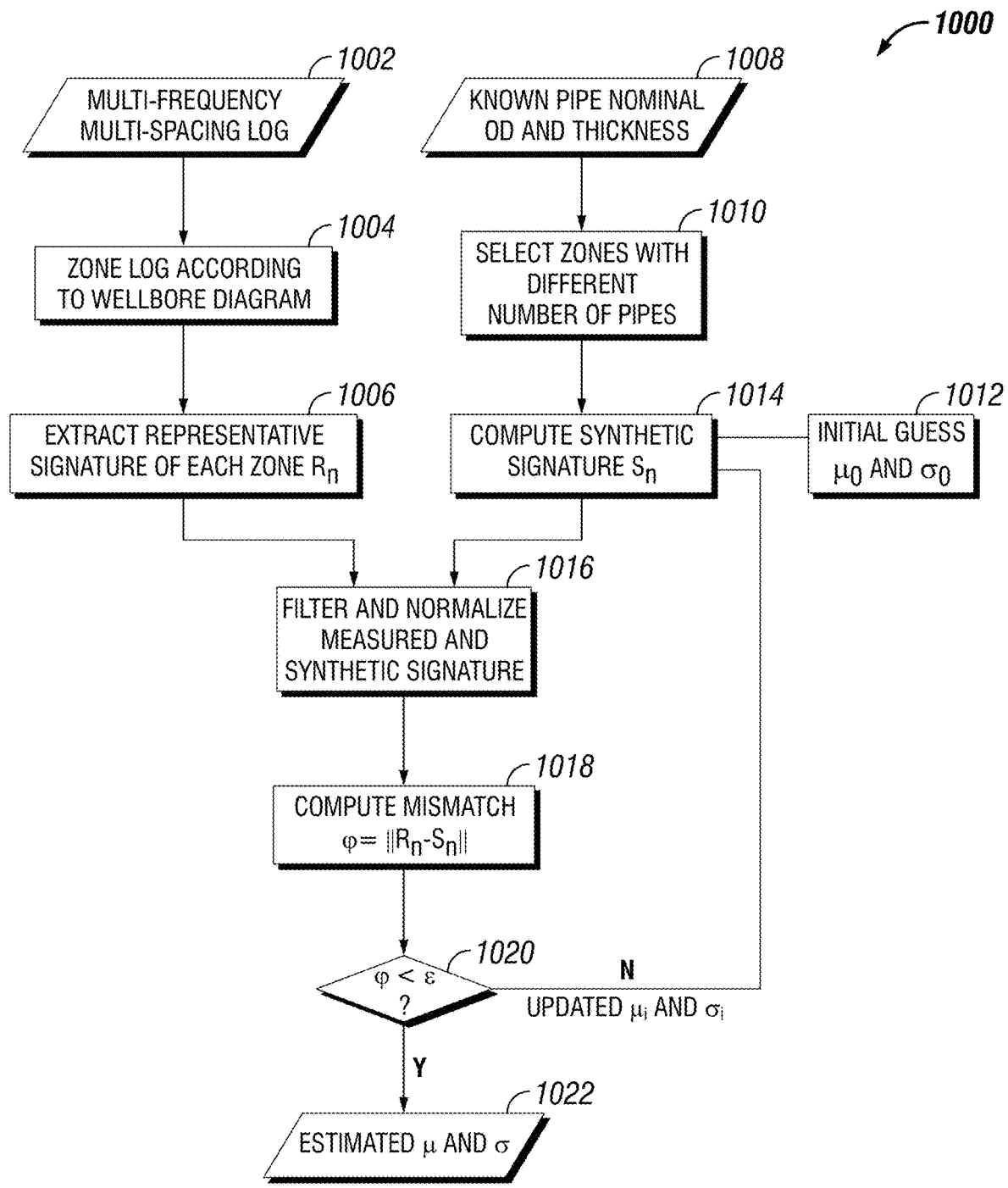
FIG. 10 is an example workflow of the mu/sigma estimation algorithm (MSEA)

Additionally, the multi-zone correction algorithm may be utilized to estimate pipe material properties, such as magnetic permeability $\mu$ and electrical conductivity $\sigma$. Workflow 1000 of the mu/sigma estimation algorithm (MSEA) is shown in FIG. 10, in accordance with some embodiments. Workflow 1000 may begin with block 1002 where a logging operation may be performed to obtain a multi-frequency and multi-spacing log. In this block EM logging tool 100 may be disposed in wellbore 110 (e.g., referring to FIG. 1) for logging operations. During logging operations, one or more transmitters may emit an electromagnetic field and form eddy currents within a secondary conductive structure. One or more receivers may sense and/or measure the eddy currents in a frequency and/or time domain. Measurements may be taken and formed into a log.

In block 1004, the log is zoned into sections with different pipe number according well diagram, as discussed in workflow 700 above. In block 1006, representative signals, e.g., $R_n$, are extracted as the tool response under the condition of nominal pipe configuration for all sections, as discussed in workflow 700 above.

In block 1008 known pipe parameters (nominal outer diameter and thickness) may be found from a database detailing the information during the formation of well plan 400 (e.g., referring to FIG. 4). In block 1010, zones are selected as they were in block 1004. In block 1012, initial guess $\mu_0$ and $\sigma_0$ may be formed. In this example, $\mu_0$ is defined as the initial magnetic permeability and $\sigma_0$ is defined as the initial electrical conductivity. It should be noted that the initial magnetic permeability and the initial electrical conductivity may be provided from databases and information regarding the material used in well plan 400. Each material in well plan 400 may have a property value that is identified before construction of well plan 400. The initial guesses in block 1012 and the information from block 1010 are fed into block 1014. In block 1014 a synthetic signature, $S_n$, corresponding to the nominal configuration may be numerically acquired. n examples, a program, which may be run on information handling system 144 (e.g., referring to FIG. 1) may determine the nominal configuration for the synthetic signature.

In block 1016, to match the signal level between the $R_n$ from block 1006 and the $S_n$ from block 1014, a normalization to a selected zone may be performed. Once the pre-processing is done, in block 1018, the mismatch between the measured and synthetic logs may be computed. The mismatch may allow for the identification of an unknown pipe property that may minimize the difference between signatures extracted from measurements and synthetic signatures. In block 1020, if the mismatch is larger than the prescribed threshold, then updated $\mu_i$ and $\sigma_i$ may be used to compute synthetic log in block 1014 and repeat the comparison until this condition is satisfied in block 1022. A class of optimization method may be used to speed up the procedure of finding optimal parameters. Then the estimated pipe properties may be assigned to all pipes. For example, the mismatch may be evaluated as follows:

$$f(\mu_1, \ldots, \mu_n, \ldots, \mu_N, \sigma_1, \ldots, \sigma_n, \ldots, \sigma_N) = \Sigma_i \Sigma_m \{ \|W_{abs}(m,i) \times [R_{abs}^{meai}(m,i) - R_{abs}^{syn_i}(m,i)]\|_2^2 + \|W_{angle}(m,i) \times [R_{angle}^{meai}(m,i) - R_{angle}^{syn_i}(m,i)]\|_2^2 \}$$ (6)

This misfit function contains EM responses from all zones for m channels. Different quantities in Equation (6) are defined as follows: n is defined as an index of the pipe number from 1 to N, N is the total pipe number, $\mu_n$ is a magnetic permeability of pipe n, $\sigma_n$ is an electrical conductivity of pipe n, m is an index of EM measurements at different frequencies and receivers from 1 to $N_{Rx} \times N_f$, $N_{Rx}$ is the number of receivers, and $N_f$ is the number of frequencies. $R_{abs}^{meai}$ and $R_{angle}^{meai}$ is an amplitude, phase ratio between average or nominal value of the measured data from a selected reference zone and the i-th zone, $R_{abs}^{syn_i}$, $R_{angle}^{syn_i}$ is an amplitude, phase ratio between nominal value of the synthetic data from a selected reference zone and the i-th zone, and $W_{abs}$, $W_{angle}$ are weights for amplitude or phase of the zone transition between current zone and zone above.

Figure 11:
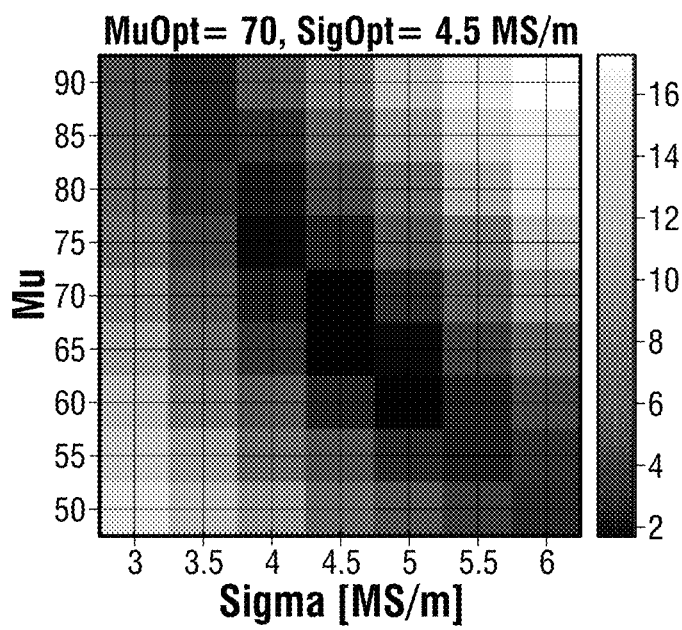
FIG. 11 is an example graph of a misfit distribution.
Figure 12:
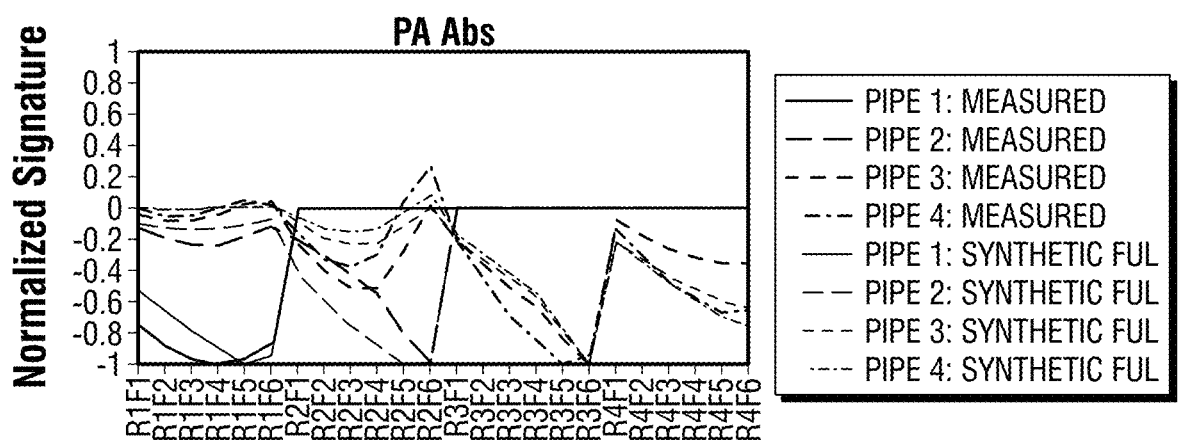
FIG. 12 is an example graph comparing measured and synthetic nominal signatures.

In examples, the MSEA may be applied to synthetic log 600 as shown in FIG. 6 to retrieve the pipe magnetic permeability and electrical conductivity. As shown in FIG. 11, the combination of mu=70 and sigma=4.5×10$^6$ S/m gives the minimum mismatch between measured and synthetic signatures. These values match the prescribed parameters for simulation. A good agreement between measured and synthetic signatures for each channel may be observed in FIG. 12.

Additionally, the multi-zone processing may be applied to electromagnetic pipe inspection tools to estimate total pipe thickness. It should be noted that when a transimpedance response, due to direct coupling between transmitter 102 and receiver 104 inside wellbore 110 (e.g., referring to FIG. 1), is smaller compared to the contribution from the field penetrating one or more tubulars in wellbore 110, the so-called remote-field eddy-current (RFEC) effect may be observed. In a RFEC regime, the mutual impedance between transmitter 102 and receiver 104, may be sensitive to the thickness of a tubular wall. To be more specific, the phase of the impedance varies as Equation (1) above, and the magnitude of the impedance shows the dependence as Equation (2) above.

In examples, both the amplitude and phase may be used to establish the mapping function, because the phase may be wrapped with the change in total pipe thickness. For example, for a 10 Hz EM wave, the phase change with twice passes a pipe with $\mu=100\mu_0$, $\sigma=4.5 \times 10^6$ S/m, and t=1 cm is 2.67 rad. For a pipe with three times thickness, the phase change is 8.0 rad. In real measurement, a phase change of 8.0−2π=1.72 rad may be measured. This also corresponds to a phase change caused by a pipe with 0.645 cm thickness. If only phase is used, the ambiguity may exist. The thickness may be incorrectly recovered. Thus, the amplitude is introduced into this disclosure to solve the ambiguity, since the pipes with 0.645 cm and 3 cm may produce responses with different amplitude.

Figure 13:
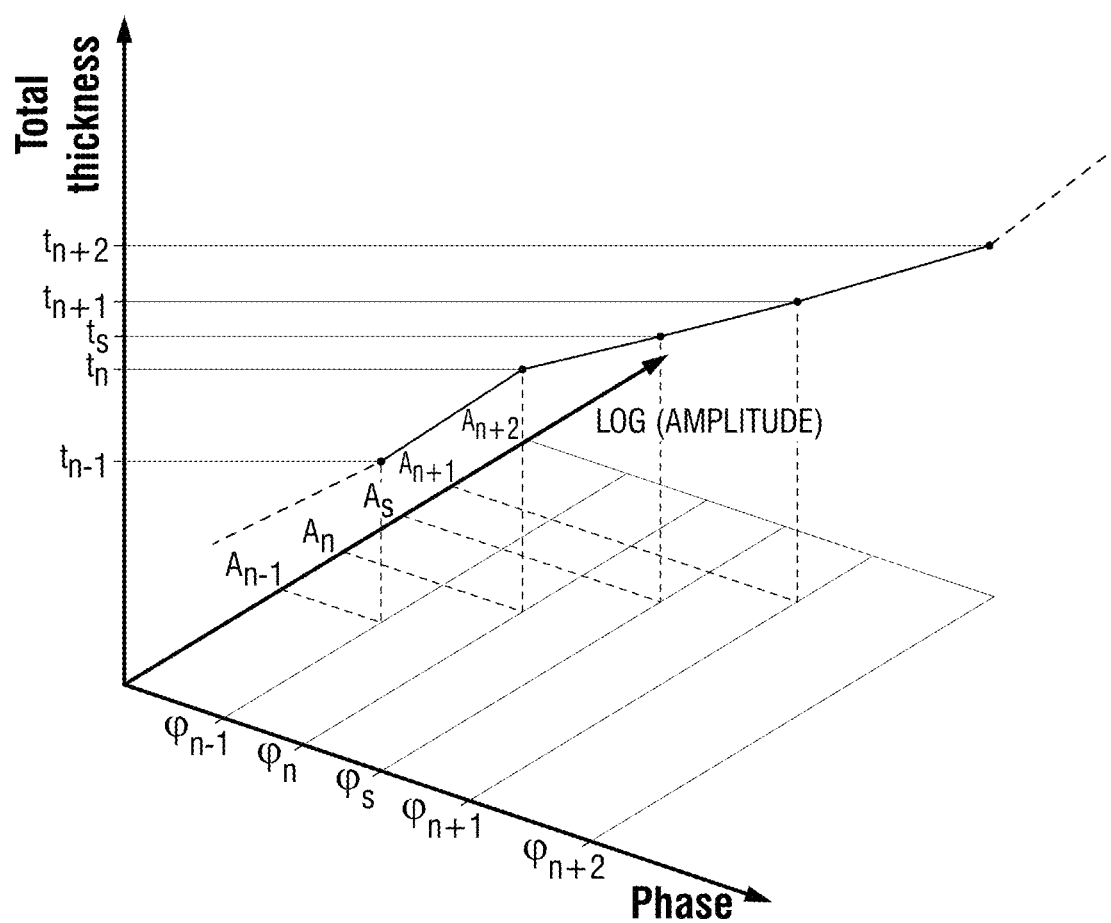
FIG. 13 is an example graph of a two-dimensional piece-wise linear mapping function.

Consequently, a two-dimensional (2D) piece-wise linear mapping function between the amplitude/phase of mutual impedance and the total metal thickness may be constructed to perform fast calculation of the total thickness of multiple pipes. The prior information including nominal pipe thickness and corresponding representative signals may be utilized to establish this 2D piece-wise linear mapping function. As abovementioned, the measured log may be divided into zones with different pipe number according to well plan 400 (e.g., referring to FIG. 4). Then the representative signals may be extracted as the tool response under the condition of nominal pipe configuration. By having the amplitude and phase of these pivot points, e.g., $(A_{n-1}, \varphi_{n-1})$, $(A_n, \varphi_n)$, $(A_{n+1}, \varphi_{n+1})$, and $(A_{n+2}, \varphi_{n+2})$, and the corresponding total thicknesses, e.g., $t_{n-1}$, $t_n$, $t_{n+}$, and $t_{n+2}$, a 2D piece-wise linear mapping function is established as shown in FIG. 13 for the points $(A_{n-1}, \varphi_{n-1}, t_{n-1})$, $(A_n, \varphi_n, t_n)$, $(A_{n+1}, \varphi_{n+1}, t_{n+1})$ and $(A_{n+2}, \varphi_{n+2}, t_{n+2})$. This mapping function may be employed then for the inversion of any other measured amplitude/phase to the total thickness of the pipes for any unknown pipe section. For example, FIG. 13 shows that a measured amplitude $A_s$ and phase $\varphi_s$ of the pipe section may be mapped to total thickness of $t_s$ when using this mapping function. Any unknown total thickness $t_s$ may then be computed from this mapping function given the measured phase $\varphi_s$.

It should be noted that an adequate number of receivers 104 to use based on sensitivity to zone transitions may also be found. For example, within each zone, the sensitivity of each one of the channels to zone transitions is computed. This essentially bears information on how much each channel would respond to a 100% metal loss (or gain) on one of the pipes (typically it is the outermost pipe). From that information, the shortest spacing set of receivers with sensitivity above certain pre-defined threshold (e.g., 5% or 10%) may be picked and used for the inversion within that zone. Other longer spacing receivers might be excluded to improve the vertical resolution.

Improvements discussed above may include that the MZCA may eliminate the discrepancy between EM logging tool 100 (e.g., referring to FIG. 1) and model for numerical simulation including the effect of magnetic core. The MSEA may provide more accurate pipe magnetic permeability and electrical conductivity. The CSA may provide a quantitative strategy to select channels for inversion in calculating individual pipe thickness. The accuracy of TTA may also be improved, which help make decisions on the integrity of the well. All of these methods may improve the tool accuracy, finally provide better interpretation to our customers.

This method and system for determining corrosion along a tubular in a wellbore may include any of the various features of the compositions, methods, and system disclosed herein, including one or more of the following statements.

Statement 1: A method for estimating a pipe property for a plurality of nested pipes may comprise disposing an electromagnetic logging tool in a wellbore. The electromagnetic logging tool may comprise a transmitter disposed on the electromagnetic logging tool and a receiver disposed on the electromagnetic logging tool. The method may further comprise transmitting an electromagnetic field from the transmitter into a pipe string to energize the pipe string with the electromagnetic field thereby producing an eddy current that emanates from the pipe string, measuring the eddy current in the pipe string with the receiver on at least one channel to obtain a plurality of measurements, forming a log from the plurality of measurements, zoning the log into a plurality of zones based at least in part on a well plan, and extracting a representative signal for each zone of the plurality of zones.

Statement 2. The method of statement 1, further comprising correcting the plurality of measurements using a constructed mapping function.

Statement 3. The method of statement 2, further comprising forming a non-linear mapping function from the representative signal and a synthetic signal.

Statement 4. The method of statements 1 or 2, further comprising estimating a pipe magnetic permeability and an electrical conductivity at least partially from the plurality of measurements.

Statement 5. The method of statement 4, further comprising minimizing a mismatch to determine the pipe magnetic permeability and the electrical conductivity.

Statement 6. The method of statements 1, 2, and 4, further comprising computing total pipe thickness using a multi-zone based on total thickness estimation algorithm.

Statement 7. The method of statement 6, further comprising constructing a two-dimensional non-linear mapping function between an amplitude and a phase of the representative signal.

Statement 8. The method of statements 1, 2, 4, and 6, further comprising determining a number of receivers to use in an inversion.

Statement 9. The method of statement 8, further comprising computing a sensitivity for one or more channels.

Statement 10. The method of statements 1, 2, 4, 6, and 8, wherein the plurality of measurements are in a time-domain or a frequency-domain.

Statement 11. The method of statements 1, 2, 4, 6, 8, and 10, wherein the log is divided into several sections according to a pipe configuration from the well plan.

Statement 12. The method of statement 11, wherein the pipe configuration is a number of pipes in the well plan and a thickness for each pipe.

Statement 13. The method of statements 1, 2, 4, 6, 8, 10, and 11, wherein the representative signal is a peak in a histogram.

Statement 14. The method of statements 1, 2, 4, 6, 8, 10, 11, and 13, wherein one of the plurality of zones does not include the pipe string.

Statement 15. The method of statement 14, further comprising performing a misfit function defined as a difference between the representative signal and a synthetic signature.

Statement 16. The method of statement 15, further comprising calculating a total pipe thickness from a two-dimensional non-linear mapping function.

Statement 17. The method of statements 1, 2, 4, 6, 8, 10, 11, 13, and 14, further comprising solving for a thickness of the pipe string with a model-based point-wise inversion using a non-linear mapping function, a pipe magnetic permeability, and an electrical conductivity.

Statement 18. A system for estimating a pipe property for a plurality of nested pipes may comprise an electromagnetic logging tool. The electromagnetic logging tool may comprise a transmitter operable to transmit an electromagnetic field and a receiver operable to measure an eddy current. The system may further comprise an information handling system configured to form a log from a plurality of measurements, create a plurality of zones for the log based at least in part on a well plan, and extract a representative signal for each zone of the plurality of zones.

Statement 19. The system of statement 18, wherein the information handling system is further configured to correct the plurality of measurements using a constructed mapping function, estimate a pipe magnetic permeability and an electrical conductivity, compute total pipe thickness using a multi-zone based on total thickness estimation algorithm or determine a number of receivers to use in an inversion.

Statement 20. The system of statement 19, wherein the information handling system is further configured to form a non-linear mapping function from the representative signal and a synthetic signal.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating a pipe property for multiple concentric pipes comprising:
    disposing an electromagnetic logging tool in a wellbore comprising the multiple concentric pipes, and wherein the electromagnetic logging tool comprises:
        a transmitter disposed on the electromagnetic logging tool; and
        at least one receiver disposed on the electromagnetic logging tool;

transmitting an electromagnetic field from the transmitter into the multiple concentric pipes to energize the multiple concentric pipes with the electromagnetic field thereby producing an eddy current that emanates from the multiple concentric pipes;

measuring a field generated by the eddy current in the multiple concentric pipes with the at least one receiver to obtain a plurality of measurements;

forming a log from the plurality of measurements;

dividing the log into a plurality of zones based at least in part on a well plan;

extracting a representative signal for each zone of the plurality of zones, wherein the representative signal is a nominal signal and wherein the nominal signal is a most common measurement of the plurality of measurements for each zone; and determining a pipe property of the one or more pipes based at least in part on the representative signal.

2. The method of claim 1, further comprising correcting the plurality of measurements using a constructed mapping function.

3. The method of claim 2, further comprising forming a non-linear mapping function from the representative signal.

4. The method of claim 1, wherein the pipe property further comprises a pipe magnetic permeability and an electrical conductivity.

5. The method of claim 4, further comprising minimizing a mismatch to determine the pipe magnetic permeability and the electrical conductivity, wherein the mismatch is a difference between the representative signal and a synthetic signature.

6. The method of claim 1, further comprising computing individual pipe thickness using a multi-zone permeability and conductivity estimation algorithm.

7. The method of claim 6, further comprising constructing a two- dimensional non-linear mapping function comprising a first independent variable, a second independent variable, and a dependent variable, wherein the first independent variable is an amplitude of the representative signal, the second independent variables is a phase of the representative signal, and the dependent variable is total pipe thickness.

8. The method of claim 1 further comprising determining a number of receivers based at least in part on a channel selection algorithm.

9. The method of claim 8, further comprising computing a sensitivity for the at least one receiver with the plurality of measurements.

10. The method of claim 1, wherein the plurality of measurements are in a time-domain or a frequency-domain.

11. The method of claim 1, wherein the pipe configuration comprises a number of pipes in the well plan and a nominal thickness for each pipe.

12. The method of claim 1, further comprising performing a misfit function defined as a difference between the representative signal and a synthetic signature.

13. The method of claim 12, further comprising calculating a pipe thickness from a two-dimensional non-linear mapping function, wherein the two-dimensional mapping function further comprises a first independent variable, a second independent variable, and a dependent variable, wherein the dependent variable is a total pipe thickness.

14. The method of claim 13, wherein the first independent variable is an amplitude of the representative signal and the second independent variable is a phase of the representative signal.

15. The method of claim 1, further comprising solving for a thickness of the one or more pipes with a model-based point-wise inversion using a non-linear mapping function, a pipe magnetic permeability, and an electrical conductivity.

16. A system for estimating a pipe property for multiple concentric pipes comprising:
an electromagnetic logging tool, wherein the electromagnetic logging tool comprises:
a transmitter to transmit an electromagnetic field;
a receiver to measure the field generated by an eddy current; and
an information handling system configured to:
form a log from a plurality of measurements;
create a plurality of zones for the log based at least in part on a well plan;
extract a representative signal for each zone of the plurality of zones, wherein the representative signal is a nominal signal and wherein the nominal signal is a most common measurement for each zone; and
determine a pipe property of the one or more pipes based at least in part on the representative signal.

17. The system of claim 16, wherein the information handling system is further configured to correct the plurality of measurements using a constructed mapping function, estimate a pipe magnetic permeability and an electrical conductivity, compute total thickness using a multi-zone permeability and conductivity estimation algorithm or determine a number of receivers to use in an inversion.

18. The system of claim 17, wherein the information handling system is further configured to form a non-linear mapping function from the representative signal.

19. The system of claim 18, wherein the non-linear mapping function comprises one or more independent variables and a dependent variable.

20. The system of claim 19, wherein the one or more independent variables further comprises an amplitude of the representative signal and wherein the dependent variable is a total pipe thickness.

* * * * *